(12) United States Patent
Mysore (10) Patent No.: US 7,685,511 B2
(45) Date of Patent: Mar. 23, 2010

(54) FRAMEWORK FOR PROVIDING AND USING SCHEMA DATA FOR MARKUP LANGUAGES

(75) Inventor: Shivaram H. Mysore, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1515 days.

(21) Appl. No.: 10/652,158

(22) Filed: Aug. 29, 2003

(65) Prior Publication Data

US 2005/0050516 A1    Mar. 3, 2005

(51) Int. Cl.
*G06F 17/00* (2006.01)

(52) U.S. Cl. ..................................................... 715/234

(58) Field of Classification Search ................... 715/234
See application file for complete search history.

(56) References Cited

U.S. PATENT DOCUMENTS

| | | | | |
|---|---|---|---|---|
| 6,725,373 | B2 * | 4/2004 | Carbajal et al. | 713/179 |
| 6,850,893 | B2 * | 2/2005 | Lipkin et al. | 705/8 |
| 6,971,017 | B2 * | 11/2005 | Stringer et al. | 713/182 |
| 7,127,608 | B2 * | 10/2006 | Royer et al. | 713/162 |
| 2002/0069179 | A1 * | 6/2002 | Slater et al. | 705/67 |

OTHER PUBLICATIONS

Rodriguez-Martinez, et al., "MOCHA: a self-extensible database middleware system for distributed data sources", SIGMOD '00: Proceedings of the 2000 ACM SIGMOD international conference on Management of data; published Jun. 2000, p. 213-224.*
Norman Walsh, "XML Catalogs, Committee Specification 1.0", Jun. 3, 2003, Copyright © 2000, 2001, 2002, 2003 Oasis Open, Inc., pp. 1-36.

* cited by examiner

*Primary Examiner*—Amelia Rutledge
(74) *Attorney, Agent, or Firm*—Sonnenschein Nath & Rosenthal LLP (57) ABSTRACT

Techniques for providing and using schema data for markup languages are disclosed. A schema model can be used to generate signed (or verifiable) schema data (e.g., XML schema data). The model can be used as a standard model that provides enhanced security and better performance. As a result, schema data can be verified more efficiently. A base class for XML schema data is provided. The base class can be instantiated to generate an XML schema file (or document). A digital signature can then be applied to the XML schema file to generate a signed XML schema file (or document). Furthermore, the resolution of data can be achieved more efficiently for markup languages because the resolution of data can be achieved systematically. In addition, techniques for storing and using signed schema data for markup languages are disclosed. An XML library can be used to store XML schema data that has been verified (or authenticated).

4 Claims, 6 Drawing Sheets

FRAMEWORK FOR PROVIDING AND USING SCHEMA DATA FOR MARKUP LANGUAGES

BACKGROUND OF THE INVENTION

The present invention relates generally to information systems, and more particularly, to techniques for providing and using schema data used for markup languages (e.g., Extensible Markup Language (XML)).

Recently various "markup" languages have been developed. For example, HTML (Hypertext Markup Language) provides a set of markup symbols or codes inserted in a file intended for display on a World Wide Web browser page. The markup tells the Web browser how to display a Web page's words and images for the user. Each individual markup code can be referred to as an element (or a tag). Some elements come in pairs that indicate when some display effect is to begin and when it is to end.

HTML is a formal Recommendation by the World Wide Web Consortium (W3C) and is generally adhered to by more commonly used web browsers (e.g., Microsoft's Internet Explorer or Netscape's Navigator). XML, is also a formal recommendation from the World Wide Web Consortium (W3C). XML is similar to the language of today's Web pages, the Hypertext Markup Language (HTML). Both XML and HTML contain markup symbols to describe the contents of a page or file. HTML, however, can describe the content of a Web page (mainly text and graphic images) only in terms of how it is to be displayed and interacted with. For example, the letter "p" placed within markup tags starts a new paragraph. On the other hand, XML can describe the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. As such, XML can be a simpler and easier-to-use subset of the Standard Generalized Markup Language (SGML), the standard for how to create a document structure. It is expected that HTML and XML will be used together in many Web applications. XML markup, for example, may appear within an HTML page.

Early applications of XML include Microsoft's Channel Format (CDF), which describes a channel, a portion of a Web site that has been downloaded to a hard disk and is then updated periodically as information changes. A specific CDF file contains data that specifies an initial Web page and how frequently it is updated. Another early application is ChartWare, which uses XML as a way to describe medical charts so that they can be shared by doctors. Applications related to banking, e-commerce ordering, personal preference profiles, purchase orders, litigation documents, part lists, and many others are anticipated.

As appreciated by those skilled in the art, XML (Extensible Markup Language) is a flexible way to create common information formats and to share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison.

Accordingly, XML can be used by any individual or group of individuals or companies that wants to share information in a consistent way. In other words, an XML file can be generated and exchanged between various entities to share information in a consistent way. In order to make sense of the XML file, however, typically XML Schema Data (or Definitions) pertaining to data references in the XML file are needed.

XSD (XML Schema Definition) is another recommendation of the World Wide Web Consortium (W3C). XSD specifies how to formally describe the elements in an Extensible Markup Language (XML) document. This description can be used to verify that each item of content in a document adheres to the description of the element in which the content is to be placed.

In general, a schema can be an abstract representation of an object's characteristics and relationship to other objects. As such, an XML schema can represent the interrelationship between the attributes and elements of an XML object (for example, a document or a portion of a document). To create a schema for a document, one can analyze its structure, defining each structural element as it is encountered. For example, within a schema for a document describing a Web site, you would define a Web site element, a Web page element, and other elements that describe possible content divisions within any page on that site. XML Schema definition (XSD) is believed to offer several advantages over earlier XML schema languages, such as document type (DTD) or Simple Object XML (SOX). For example, it's more direct: XSD, in contrast to the earlier languages, is written in XML, which means that it doesn't require intermediary processing by a parser. Other benefits include self-documentation, automatic schema creation, and the ability to be queried through XML Transformations (XSLT).

Conventionally, when an XML file is received, schema data (e.g., XSD, DTD files, etc.) need to be accessed in order to make sense of the XML file (e.g., verifying data). The schema data is generally made available by standard organizations. This means that there is extensive use of references to external XML schema data (e.g., XSD, or DTD files). As a result, performance is adversely affected because, among other things, sockets (or similar mechanisms) are needed for down loading schema data files. In addition, conventional approaches do not allow for systematic validation of data because, among other things, the XML schema data is provided in accordance with different specifications by various entities.

Another problem is that the conventional approaches are generally not secure as data is typically downloaded from various Web sites. This poses very serious security risks because the entity that downloads schema data can easily be misinformed by an honest mistake or intentionally be given corrupt data. In any case, lack of security can result in very adverse consequences. Yet another problem with the conventional approach is that privacy is greatly compromised because an entity can be monitored. This information can be saved and analyzed for various reasons and applications. For example, an entity can be monitored for XML schema data that it frequently uses. This can be used to profile the entity for marketing and advertising applications.

Accordingly, techniques for providing and using XML schema data are needed.

SUMMARY OF THE INVENTION

Broadly speaking, the invention relates to techniques for providing and using schema data for markup languages. In one aspect, the invention provides a model that can be used to generate signed (or verifiable) schema data (e.g., XML schema data). As will be appreciated, the model can be used as a standard model that, among other things, provides enhanced security and better performance. As a result, schema data can be verified efficiently. This can, for example, be achieved by comparing a digital signature that is associated with a plurality of XML schema data in accordance with one embodiment of the invention. In one embodiment, a base class for XML schema data is provided. As will be appreciated, the base class can be instantiated to generate an XML schema file (or document). A digital signature can then be applied to the XML schema file to generate a signed XML schema file (or document).

Furthermore, the resolution of data can be achieved more efficiently for markup languages because, among other things, the resolution of data can be achieved systematically (e.g., by a computer program configured to access the XML schema data and perform various operations on the data).

Other aspects of the invention provide techniques for storing and using signed schema data for markup languages. As will be appreciated, upon verification of signed schema data, the schema data can be stored in a secure location (e.g., local disk, private network, etc.). In accordance with one embodiment of the invention, an XML catalog and an XML library are generated. The XML library can be used to store XML schema data that has been verified (or authenticated). The XML catalog catalogs the information stored in the XML library. As such, verified XML schema data can be efficiently accessed. An XML parser can be configured to search the XML catalog and/or XML library.

The invention can be implemented in numerous ways, including a system, an apparatus, a method or a computer readable medium. Several embodiments of the invention are discussed below.

As a method for processing XML schema data suitable for resolving references found in an XML file, one embodiment of the invention includes the acts of: receiving a digitally signed XML schema file, determining whether the digitally signed XML schema file can be verified, and storing at least one portion of data of the digitally signed XML schema file when it is determined that said digitally signed XML schema file can be verified.

As a method for processing an XML file including at least one reference that requires XML schema data to process, one embodiment of the invention the acts of: receiving an XML file, determining whether at least one reference of the XML file can be resolved using verified XML schema data, and resolving the at least one reference when the at least one reference of the XML file can be resolved using the verified XML schema data.

As a method of generating a signed XML schema file, one embodiment of the invention includes the acts of: providing an XML schema model, generating an XML schema data using the XML schema model, generating a digital signature for the XML schema file, and generating a signed XML schema file that includes the XML schema data and the digital signature.

As a computing system capable of receiving and processing an XML file which includes at least one reference that requires XML schema data, one embodiment of the invention includes the acts of: receiving a digitally signed XML schema file, determining whether the digitally signed XML schema file can be verified, and storing at least one portion of data of the digitally signed XML schema file when the digitally signed XML schema file can be verified.

As a method of processing schema data for a markup language for resolving references in a file that includes information in that markup language, one embodiment of the invention includes the acts of: receiving a digitally signed schema file, determining whether the digitally signed schema file can be verified, and storing at least one portion of data of the digitally signed schema file when the digitally signed XML schema file can be verified.

As a method of generating a signed schema file for a markup language, one embodiment of the invention includes the acts of: providing a schema model, generating schema data using the schema model, generating a digital signature for the schema file, and generating a signed schema file that includes schema data and digital signature.

As a computer readable media including computer program code for processing XML schema suitable for resolving references in an XML file, one embodiment of the invention includes: a computer program code for receiving a digitally signed XML schema file, computer program code for determining whether the digitally signed XML schema file can be verified, and computer program code for storing at least one portion of data of the digitally signed XML schema file when the digitally signed XML schema file can be verified.

As a computer readable medium including computer program code for processing an XML file including at least one reference that requires XML schema data to process, one embodiment of the invention includes: computer program code for receiving an XML file, computer program code for determining whether the least one reference of the XML file can be resolved using the verified XML schema data, and computer program code for resolving the at least one reference when the at least one reference of the XML file can be resolved using the verified XML schema data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, conventional approaches do not provide a suitable framework for providing and using schema data for markup languages. Conventional approaches, among other things, fail to provide a systematic way to verify and resolve XML data. Generally, XML schema data is not authenticated. As a result, security can be compromised. In addition, schema data is typically provided by several entities using various formats to arrange XML schema data. In any case, XML schema data is typically downloaded as needed to resolve references. As a result, performance is degraded because, among other things, there is a significant cost associated with downloading and conventionally resolving data that is arranged in various formats. Accordingly, improved techniques for providing and using schema data for markup languages are needed.

To achieve these and other objectives of the invention, techniques for providing and using schema data for markup languages are disclosed. In one aspect, the invention provides a model that can be used to generate signed (or verifiable) schema data (e.g., XML schema data). As will be appreciated, the model can be used as a standard model that, among other things, provides enhanced security and better performance. As a result, schema data can be verified efficiently. This can, for example, be achieved by comparing a digital signature that is associated with a plurality of XML schema data in accordance with one embodiment of the invention. In one embodiment, a base class for XML schema data is provided. As will be appreciated, the base class can be instantiated to generate an XML schema file (or document). A digital signature can then be applied to the XML schema file to generate a signed XML schema file (or document).

Furthermore, the resolution of data can be achieved more efficiently for markup languages because, among other things, the resolution of data can be achieved systematically (e.g., by a computer program configured to access the XML schema data and perform various operations on the data).

Other aspects of the invention provide techniques for storing and using signed schema data for markup languages. As will be appreciated, upon verification of signed schema data, the schema data can be stored in a secure location (e.g., local disk, private network, etc.). In accordance with one embodiment of the invention, an XML catalog and an XML library are generated. The XML library can be used to store XML schema data that has been verified (or authenticated). The XML catalog catalogs the information stored in the XML library. As such, verified XML schema data can be efficiently accessed. An XML parser can be configured to search the XML catalog and/or XML library.

Embodiments of the invention are discussed below with reference to FIGS. 1-6. However, those skilled in the art will readily appreciate that the detailed description given herein with respect to these figures is for explanatory purposes only as the invention extends beyond these limited embodiments.

Figure 1:
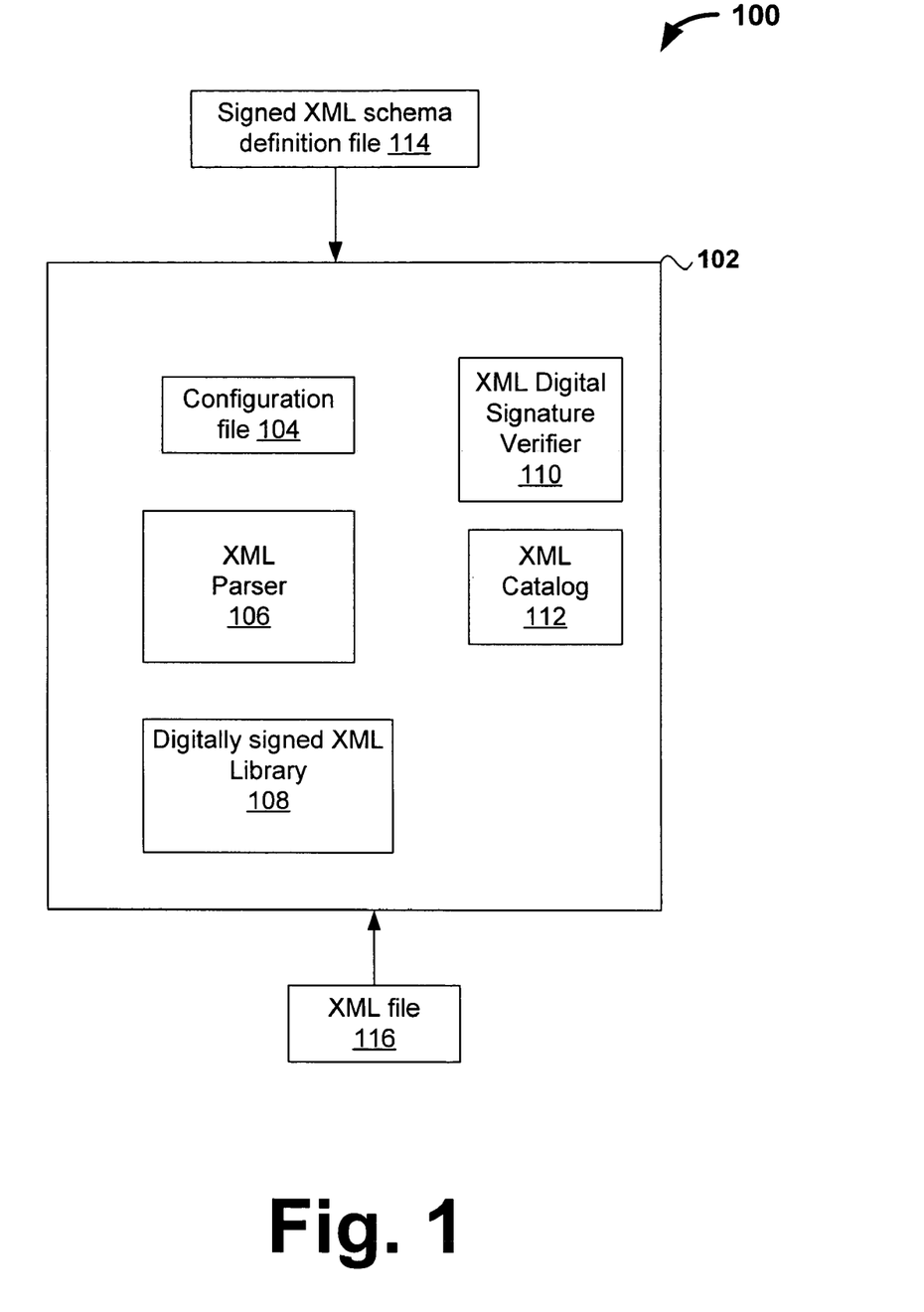
FIG. 1 illustrates an exemplary computing environment including a computing node in accordance with one embodiment of the invention.

FIG. 1 illustrates an exemplary computing environment 100 including a computing node 102 in accordance with one embodiment of the invention. The computing node 102 can, for example, be implemented as a general-purpose computer, personal desktop computer, server, cluster, multi-processor, or any other computing node that provides processing ability and memory for data storage. Although the computing environment 100 is illustrated in an XML environment, it should be noted that any other markup language that requires schema data can be used.

As illustrated in FIG. 1, the computing node 100 includes a configuration file 104, an XML parser 106, a digitally signed XML library 108, an XML digital signature verifier 110, and an XML catalog 112. It should be noted that the computing node 102 can communicate with one or more other computing nodes (not shown) through a computer network (e.g., local area network, Internet, etc.) In any case, the computing node 102 can receive (e.g., download) a signed XML schema definition file 114. The signed XML schema definition file 114 can be generated, for example, by a standard organization (e.g., World Wide Web Consortium (W3C), Organization for the Advancement of structured Information Standards (OASIS), etc.). The signed XML schema definition file 114 can be verified by the XML digital signature verifier 110. Upon verification of the digital signature, the computing node 102 can operate to store the information provided by the signed XML schema definition file. It should be noted that the information can be stored in a secured location. This information can, for example, be cataloged in an XML catalog 112 and stored in the digitally signed XML library 108. The information can, in turn, be used by the XML parser 106 to resolve an XML file. The XML 116 file that can, for example, be transmitted by another entity (not shown). In any case, the XML file 116 typically includes at least one reference that needs to be resolved using schema definition data. The XML parser 106 operates to resolves this reference based on the schema definition data. As will be appreciated, the XML parser 106 can be configured by a configuration file 104, to determine whether a reference in the XML file 116 can be resolved using the information stored in the digitally signed XML 108.

Figure 2:
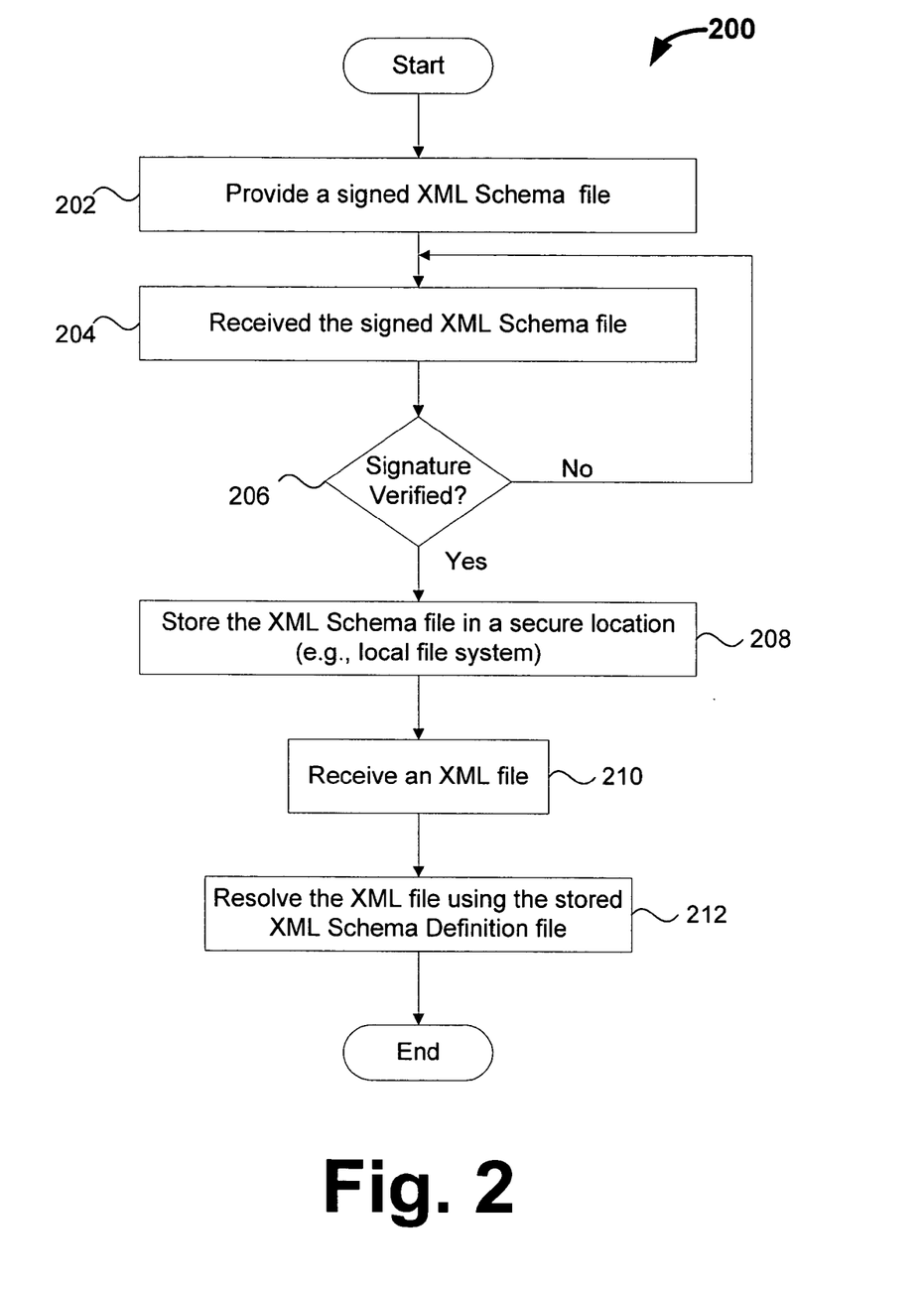
FIG. 2 illustrates a method for resolving XML references in accordance with one embodiment of the invention.

To elaborate further, FIG. 2 illustrates a method 200 for resolving XML references in accordance with one embodiment of the invention. Initially, at operation 202 a signed XML schema file is provided. The signed XML schema file is typically provided by a first entity and made available to other entities. Next, at operation 204, the XML schema file is received. Thereafter, the method 200 proceeds to operation 206 where a determination is made as to whether the signature can be verified. If it is determined at operation 206 that the signature cannot be verified, the method 200 proceeds to operation 204 where an XML schema file can be received. However, if the signature is verified at operation 206, the method 200 proceeds to operation 208 where the XML schema definition file is stored in a secure location (e.g., local file system). Next, at operation 210, an XML file is received. It should be noted that the XML file typically requires a reference that needs to be resolved using XML schema data. Thereafter, the method 200 proceeds to operation 212 where the XML file is resolved using the stored XML schema file. The method 200 ends following operation 212.

Figure 3:
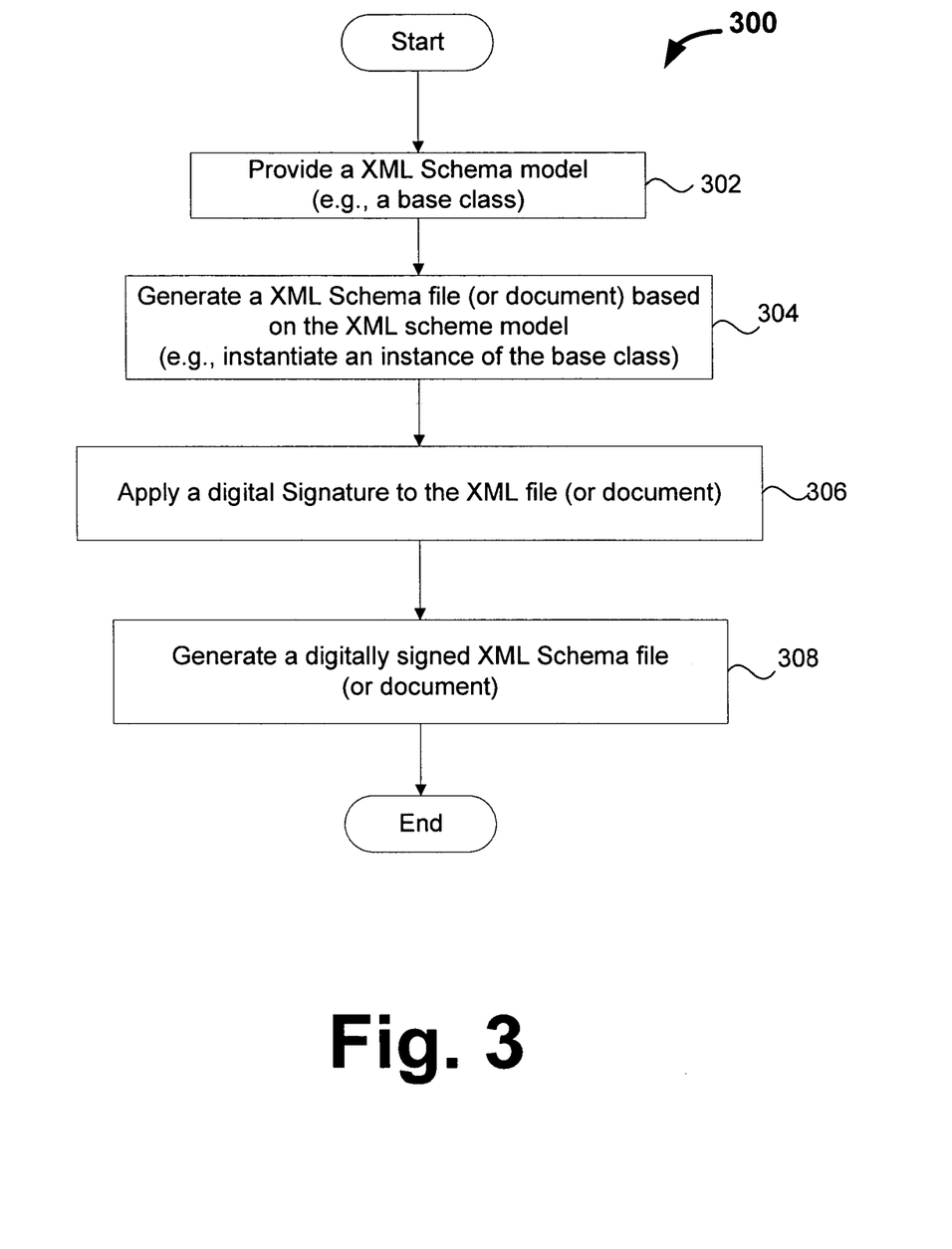
FIG. 3 illustrates a method for generating a signed XML schema file in accordance with one embodiment of the invention.

As noted above, a signed XML schema file can be provided in accordance with one aspect of the invention. FIG. 3A illustrates a method 300 for generating a signed XML schema file in accordance with one embodiment of the invention. The method 300, can for example, represent the processing that is performed at operation 202 of FIG. 2. Initially, at operation 302 an XML schema model is provided. By way of example, a base class can be provided. As will be appreciated, the base class can be used as a standard model (or template) for generating XML schema data. Next, at operation 304, an XML schema file (or document) is generated based on the XML schema model. By way of example, an instance of a base class can be instantiated (or generated). In any case, at operation 306, an XML digital signature can be applied to the generated schema file (or document). Accordingly, at operation 308, a digitally signed XML Schema file is generated. The method 300 ends following operation 308.

Figure 4A:
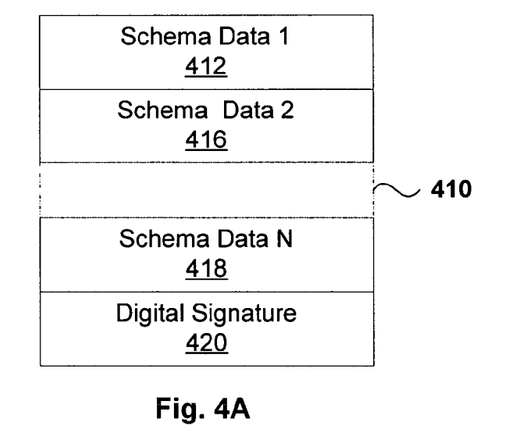
FIG. 4A illustrates a signed XML schema file (or document) in accordance with one embodiment of the invention.

FIG. 4A illustrates a signed XML schema file (or document) 410 in accordance with one embodiment of the invention. The XML schema 410 includes a plurality of schema data components 412, 416 and 418. It should also be noted that the XML schema definition file 402 includes a digital signature 420 which is associated with the schema data components 412, 416 and 418. As will be appreciated, each of the schema data components 412, 416 and 418 can be generated based on an XML schema definition model that is provided in accordance with one aspect of the invention.

Figure 4B:
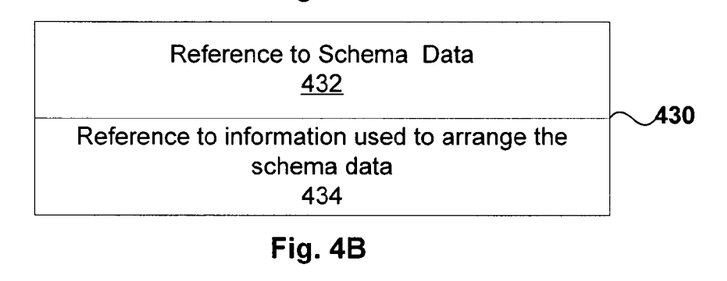
FIGS. 4B and 4C illustrate XML schema models in accordance with two embodiments of the invention.

FIG. 4B illustrates an XML schema model 430 in accordance with one embodiment of the invention. The XML schema model 430 can be used to generate, for example, schema data components 412, 416 and 418. As illustrated in FIG. 4B, the XML schema model 430 includes a reference to schema data 432 and a reference to sorting information (or data) used to arrange the schema definition data.

Figure 4C:
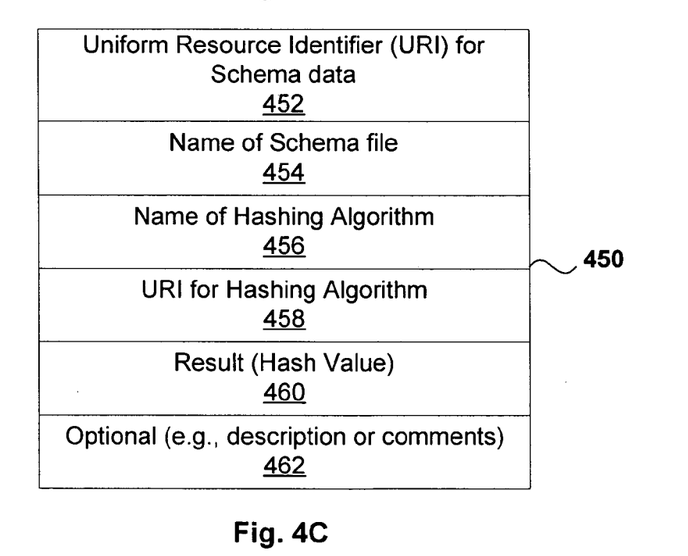

Similarly, FIG. 4C illustrates an XML schema definition model 450 in accordance with another embodiment of the invention. The XML schema definition model 450 includes the following components: a Uniform Resource Identifier (URI) for the schema data 452, a name for the schema data 454, a name of a hashing algorithm 456, a Uniform Resource Identifier (URI) for the hashing algorithm 458, and the result (or hash value) 460, and an optional component 462.

The Uniform Resource Identifier (URI) for the schema data 452 provides a reference to the schema data. As will be appreciated by those skilled in the art, a URI can be a way to identify a point of content in the Internet space. The point of content can be, for example, a page of text, a video or sound clip, a still or animated image, or a program. One common form of URI is the Web page address, which is a particular form or subset of a Uniform Resource Locator (URL). In any case, a URI typically describes: the mechanism used to access the resource on the specific computer that the resource is housed in, and the specific name of the resource (a file name) on the computer. For example, the URI: "http://www.w3.org/patents/WWW/w3c_my.gif" identifies a file that can be accessed using the Web protocol application, Hypertext Transfer Protocol, ("http://") that is housed on a computer named "www.w3.org" (which can be mapped to a unique Internet address). In the computer's directory structure, the file is located at the pathname of "/patents/WWW/w3c_my.gif."

By way of example, the URI for the schema data 452 can be "http://www.w3.org/2001/09/dsig.xsd." As such, the name of the schema definition data 454 can be "disg.xsd." Similarly, the name of a hashing algorithm 456 and a URI for the hashing algorithm 458 can respectively identify the name and the URI for the hashing algorithm that is used to sort (or arrange) schema data. This hashing of data, among other things, allows data to be stored and accessed in an efficient manner. As will be appreciated by those skilled in the art, the hashing algorithm can be, for example, a "sha1" based algorithm, a "md5" based algorithm, or any other hashing algorithm that operates to organize data in accordance with a hash value. Accordingly, the result (or hash value) 460 provides a hash value (or unique identifier) that can be used to access data. Finally, an optional field 462 can be provided for storing any additional data. The optional field 462 can, for example, include the written description (or comments) used to describe the schema data.

In any case, the XML schema model 450 can be used as a standard model for generating schema files (e.g., schema file 410). The schema definition files can, for example, be generated and digitally signed by various standard organizations and then made available to other entities. These entities can, in turn, selectively access the schema files that they need and store them for future use in accordance with one aspect of the invention.

Figure 5:
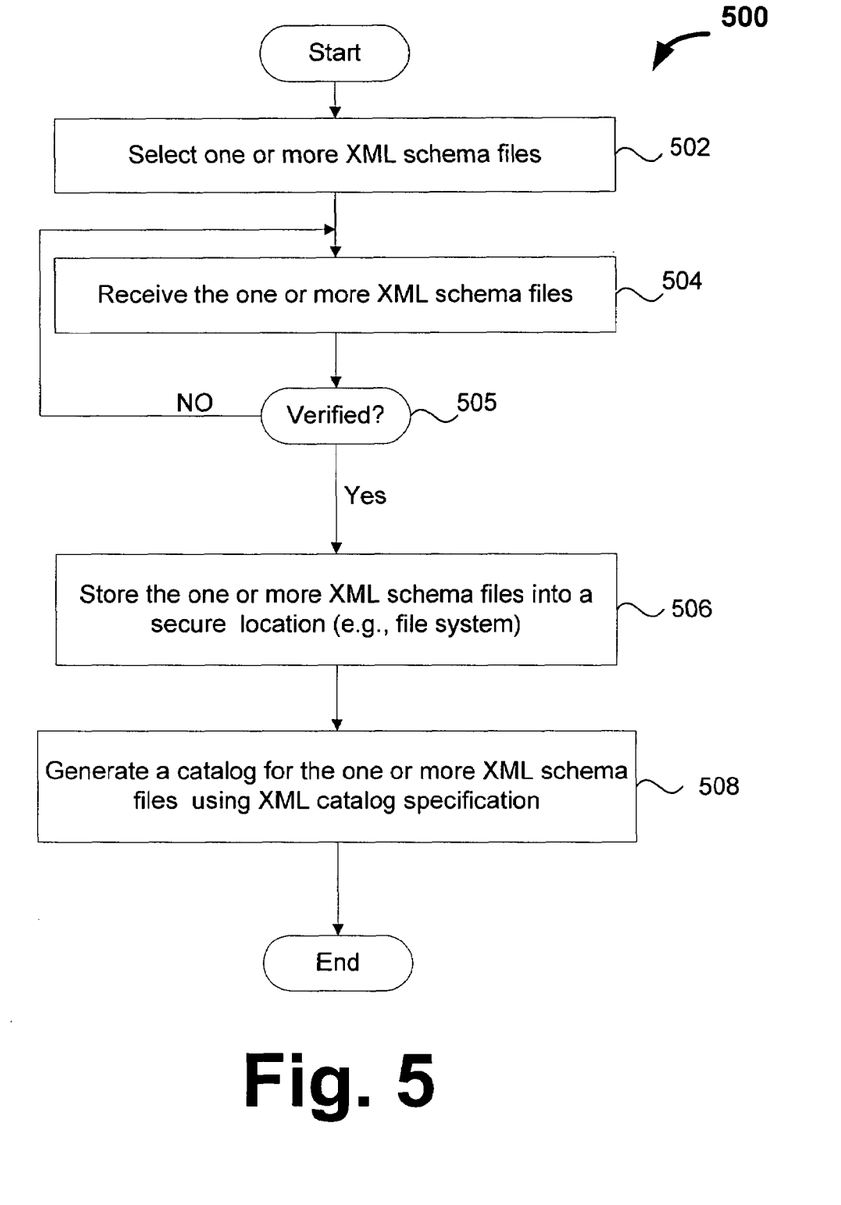
FIG. 5 illustrates a method for storing XML schema files in accordance with one embodiment of the invention.

FIG. 5 illustrates a method 500 for storing XML schema files in accordance with one embodiment of the invention. The method 500 represents the processing that can, for example, be performed by operation 208 of FIG. 2. Initially, at operation 502, one or more XML schema definition files are selected. Next, at operation 504, the one or more XML schema files are received (e.g., downloaded). Thereafter, the method 500 proceeds to operation 506 where if it is determined whether the one or more XML schema files can be verified. When it is determined that the one or more XML schema files verified are verified, the method 500 proceeds to operation 500 where the one or more schema files are stored into a secure location (e.g., local files, secure private network, etc.). Finally, at operation 508, an XML catalog for the one or more XML schema files is generated. As will be appreciated by those skilled in the art, the XML catalog can be generated in accordance with an XML catalog specification. The method 500 ends following operation 508.

Figure 6:
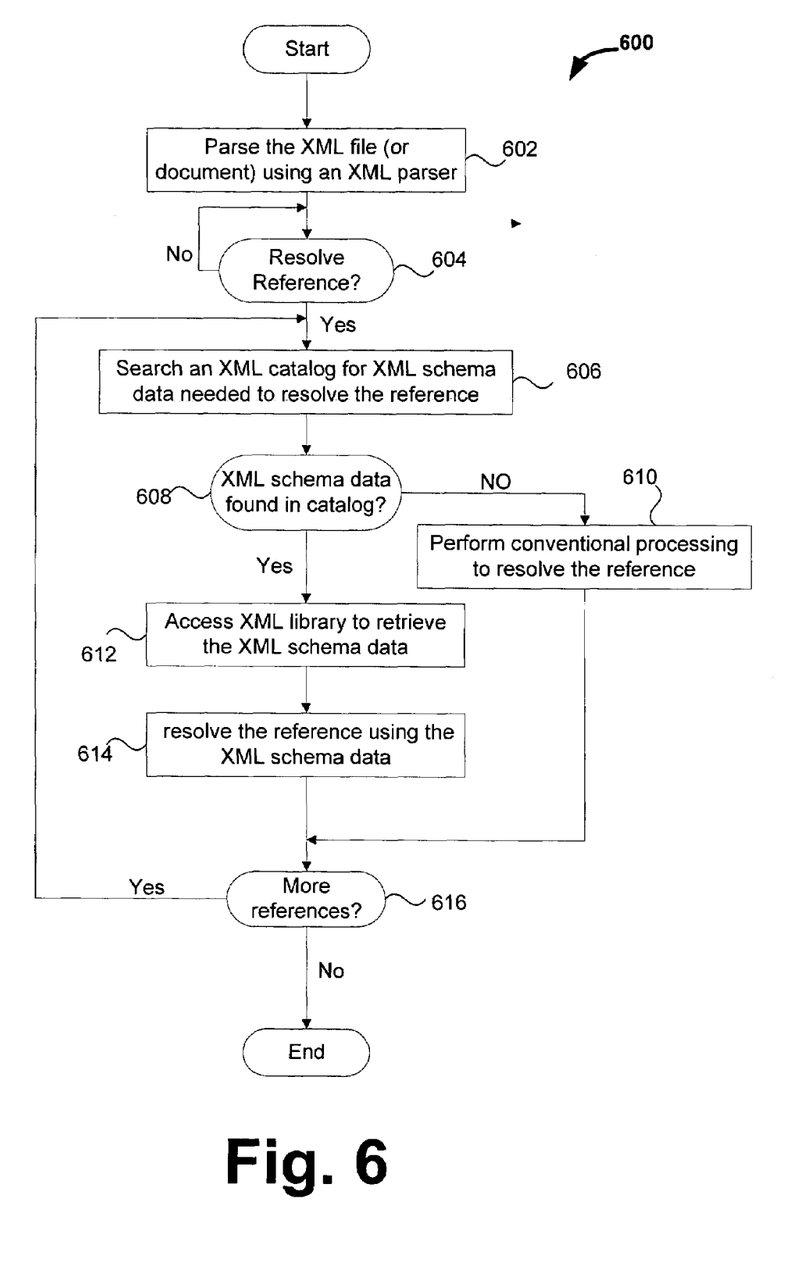
FIG. 6 illustrates a method for resolving references found in an XML file (or document) in accordance with one embodiment of the invention.

FIG. 6 illustrates a method 600 for resolving references found in an XML file (or document) in accordance with one embodiment of the invention. The method 600 represents, for example, the processing that can be performed at operation 212 of FIG. 2. Initially, at operation 602, the XML file (or document) is parsed using an XML parser. Next, at operation 604, it is determined whether a reference needs to be resolved. Accordingly, at operation 606, when it is determined that a reference needs to be resolved, an XML catalog is searched to determine whether the XML schema data needed to resolve the reference is available. Thereafter, the method 606 proceeds to operation 608 where it is determined whether the XML schema data is found in the XML catalog. If it is determined at operation 608 that the XML schema data was not found, the method 600 proceeds to operation 610 where conventional processing can be performed to resolve the reference. However, if it is determined at operation 608 that the XML schema data needed to resolve the reference is available, the method 600 proceeds to operation 612 where an XML library is accessed to locate the XML schema data. Accordingly, at operation 614, the XML schema data found in the XML library is used to resolve the reference. Next, at operation 616, a determination is made as to whether more references need to be resolved. If it is determined at operation 616 that a reference needs to be resolved, the method 600 proceeds to operation 606 where the XML catalog is searched to determine whether the XML schema data needed to resolve the reference is available. However, if it is determined at operation 616 that no more references need to be resolved, the method 600 ends.

It should be noted that the invention allows for a systematic verification and resolution of XML data. This can be achieved because, among other things, the XML schema file is generated based on a model in accordance with one aspect of the invention. As will be appreciated, this model can be implemented to provide enhanced security and better overall performance for systems that provide and/or process XML schema data. In addition, the resolution process can be achieved more efficiently because, among other things, the resolution of XML data can be achieved systematically (e.g., by a computer program configured to access the XML schema data and perform various operations as needed on the data).

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described.

Hence, all suitable modifications and equivalents may be resorted to as falling within the scope of the invention.

What is claimed:

1. A method of generating a signed XML schema file, said method comprising:
   providing an XML schema model wherein said providing of an XML schema model includes providing a base class;
   generating an XML schema data using said XML schema model and instantiating said base class;
   generating a digital signature for said XML schema file; and
   generating a signed XML schema file that includes said XML schema data and said digital signature,
   wherein
   said XML schema model includes the following components: a Uniform Resource Identifier (URI) for schema data, a name for said schema data, a name for a hashing algorithm used to arrange schema data, a URI for said hashing algorithm, and a result (or hash value) associated with said schema data and said hashing algorithm, and
   said XML schema model includes a reference to said XML schema data included in said XML schema file and a reference to sorting information used to arrange said XML schema data.

2. A method as recited in claim 1, wherein said wherein said XML schema model further includes an optional component.

3. A method of generating a signed schema file for a markup language, said method comprising;
   providing a schema model wherein said providing of an XML schema model includes providing a base class;
   generating schema data using said schema model and instantiating said base class;
   generating a digital signature for said schema file; and
   generating a signed schema file that includes said schema data and said digital signature.
   wherein,
   said XML schema model includes the following components: a Uniform Resource Identifier (URI) for schema data, a name for said schema data, a name for a hashing algorithm used to arrange schema data, a URI for said hashing algorithm, and a result (or hash value) associated with said schema data and said hashing algorithm, and
   said XML schema model includes a reference to said XML schema data included in said XML schema file and a reference to sorting information used to arrange said XML schema data.

4. A method as recited in claim 3 wherein said markup language is an XML compliant markup language.

* * * * *

UNITED STATES PATENT AND TRADEMARK OFFICE
CERTIFICATE OF CORRECTION

| | |
|---|---|
| PATENT NO. | : 7,685,511 B2 |
| APPLICATION NO. | : 10/652158 |
| DATED | : March 23, 2010 |
| INVENTOR(S) | : Mysore |

Page 1 of 1

It is certified that error appears in the above-identified patent and that said Letters Patent is hereby corrected as shown below:

Column 10, line 1, delete the first occurrence of "wherein said".

Signed and Sealed this

First Day of June, 2010

David J. Kappos
*Director of the United States Patent and Trademark Office*